(12) United States Patent
Hong et al.

(10) Patent No.: US 9,522,322 B2
(45) Date of Patent: Dec. 20, 2016

(54) METHOD AND SYSTEM FOR GAME

(71) Applicant: NHN Entertainment Corporation, Seongnam-si (KR)

(72) Inventors: Seung Dae Hong, Seongnam-si (KR); Moo Kwan Lee, Seongnam-si (KR); Ju Hyun Lee, Seongnam-si (KR); Jin Seok Oh, Seongnam-si (KR); Eun Kyung Kim, Seongnam-si (KR); Sang bok Kim, Seongnam-si (KR)

(73) Assignees: NHN ENTERTAINMENT CORPORATION, Seongnam-si (KR); NHN PIXELCUBE CORPORATION, Seongnam-si (KR)

( * ) Notice: Subject to any disclaimer, the term of this patent is extended or adjusted under 35 U.S.C. 154(b) by 512 days.

(21) Appl. No.: 14/014,263

(22) Filed: Aug. 29, 2013

(65) Prior Publication Data
US 2014/0148252 A1    May 29, 2014

(30) Foreign Application Priority Data
Nov. 23, 2012   (KR) .......................... 10-2012-0133514

(51) Int. Cl.
*A63F 13/00*   (2014.01)
*A63F 9/24*    (2006.01)
(Continued)

(52) U.S. Cl.
CPC ................. *A63F 13/10* (2013.01); *A63F 13/44* (2014.09); *A63F 13/55* (2014.09); *A63F 13/69* (2014.09); *A63F 2300/8035* (2013.01)

(58) Field of Classification Search
CPC .......... A63F 13/00; A63F 13/44; A63F 13/55; A63F 13/69
(Continued)

(56) References Cited

U.S. PATENT DOCUMENTS 8,167,719 B2   5/2012   Cha
8,197,342 B2   6/2012   Kijima et al.
(Continued)

FOREIGN PATENT DOCUMENTS

JP   2008-264297   11/2008
JP   2009-165564    7/2009
(Continued)

OTHER PUBLICATIONS

McElroy, "Rock Band 3 review: The only rhythm game you'll ever need", Engadget, retrieved from Internet on Dec. 13, 2015 from Internet URL <http://www.engadget.com/2010/10/22/rock-band-3-review/>.*

(Continued)

*Primary Examiner* — Jason Skaarup
*Assistant Examiner* — Ryan Hsu
(74) *Attorney, Agent, or Firm* — H.C. Park & Associates, PLC

(57) ABSTRACT

A method and a system for a game are disclosed. The method includes steps displaying a determination region in at least one section distinguished by neighboring points, on a virtual passage formed by a plurality of points sequentially connected with each other. The method also includes displaying an object moving along the virtual passage on a screen, and determining an accuracy or success/failure of a user input based on a position of the object at a time when the user input is detected and a position of the determination region.

13 Claims, 15 Drawing Sheets

(51) Int. Cl.
*A63F 13/40* (2014.01)
*A63F 13/44* (2014.01)
*A63F 13/69* (2014.01)
*A63F 13/55* (2014.01)

(58) Field of Classification Search
USPC .......................................................... 463/1
See application file for complete search history.

(56) References Cited

U.S. PATENT DOCUMENTS

| | | | |
|---|---|---|---|
| 8,845,432 B2 | 9/2014 | O | |
| 2007/0232374 A1* | 10/2007 | Lopiccolo | G10H 1/342 463/7 |
| 2008/0113698 A1* | 5/2008 | Egozy | A63F 13/12 463/7 |
| 2010/0009750 A1* | 1/2010 | Egozy | A63F 13/005 463/35 |

FOREIGN PATENT DOCUMENTS

| | | |
|---|---|---|
| JP | 2010-036038 | 2/2010 |
| JP | 2012-525953 | 10/2012 |
| KR | 10-2006-0101439 | 9/2006 |
| KR | 10-2012-0109444 | 10/2012 |

OTHER PUBLICATIONS

NHN Entertainment, "[Fish Island] new concept fishing game easily catching manipulatively," Aug. 31, 2012, Republic of Korea, <http://www.youtube.com/watch?v=aEWRRwrwfCo&feature=share&list=UUww4H3kwIXgSs91J6WTIsTw>.

NHN Entertainment, "New concept fishing game enjoyed by touch and timing," Sep. 3, 2012, Republic of Korea, <http://blog.naver.com/smarthangame/130146302206>.

NHN Entertainment, "Fishing is timing! Fish Island," Sep. 11, 2012, Republic of Korea, <http://blog.naver.com/smarthangame/130146917362>.

NHN Entertainment, "Fish Island," Sep. 11, 2012, Republic of Korea, <http://cafe.naver.com/fishislandcafe/13>.

NHN Entertainment, "Fish Island," Sep. 11, 2012, Republic of Korea, <http://www.nhncorp.com/nhn/pr/pressReleaseDetail.nhn?board.currentPage=1&board.parameter.type=&board.boardNum=22623&board.parameter.periodType=99&board.parameter.regDateStart=2000.01.01&board.parameter.regDateEnd=2013.03.05&board.parameter.keyword=%EB%82%9A%EC%8B%9C>.

NHN Entertainment, "Great popularity [fish island], holds contest since Sep. 18, 2012," Sep. 17, 2012, Republic of Korea, <http://www.nhncorp.com/nhn/pr/pressReleaseDetail.nhn?board.currentPage=1&board.parameter.type=&board.boardNum=22632&board.parameter.periodType=99&board.parameter.regDateStart=2000.01.01&board.parameter.regDateEnd=2013.03.05&board.parameter.keyword=%ED%94%BC%EC%89%AC-F%EC%95%84%EC%9D%BC%EB%9E%9C%EB%93%9C>.

NHN Entertainment, "What kind of fish are catched? [fish island], new kind of fish added," Oct. 4, 2012, Republic of Korea, <http://www.nhncorp.com/nhn/pr/pressReleaseDetail.nhn?board.currentPage=1&board.parameter.type=&board.boardNum=22652&board.parameter.periodType=99&board.parameter.regDateStart=2000.01.01&board.parameter.regDateEnd=2013.03.05&board.parameter.keyword=%ED%94%BC%EC%89%AC-F%EC%95%84%EC%9D%BC%EB%9E%9C%EB%93%9C>.

NHN Entertainment, "Even game application, love of Korean alphabet, [fish island], Korean alphabet fish release.," Oct. 4, 2012, Republic of Korea, <http://www.nhncorp.com/nhn/pr/pressReleaseDetail.nhn?board.currentPage=1&board.parameter.type=&board.boardNum=22659&board.parameter.periodType=99&board.parameter.regDateStart=2000.01.01&board.parameter.regDateEnd=2013.03.05&board.parameter.keyword=%ED%94%BC%EC%89%AC-F%EC%95%84%EC%9D%BC%EB%9E%9C%EB%93%9C>.

* cited by examiner

FIG. 4
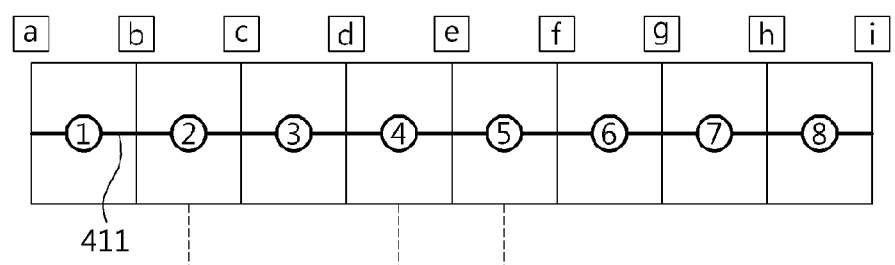
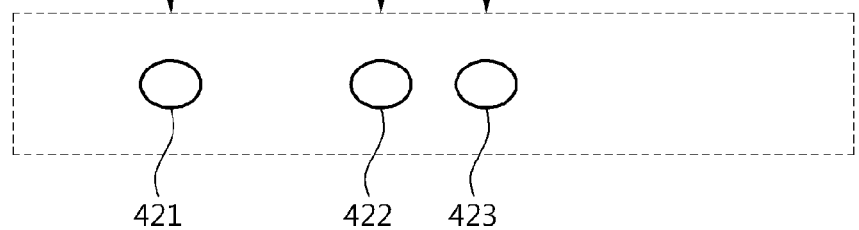

600

METHOD AND SYSTEM FOR GAME

CROSS REFERENCE TO RELATED APPLICATION

This application claims priority from and the benefit of Korean Patent Application No. 10-2012-0133514, filed on Nov. 23, 2012, which is hereby incorporated by reference for all purposes as if fully set forth herein.

BACKGROUND OF THE DISCLOSURE

Field of the Disclosure

Exemplary embodiments of the disclosure relate to a method and a system for a game.

Discussion of the Background

A conventional game (e.g., fishing game) may provide simulated experiences similar to corresponding real-life experiences (e.g., catching a fish while fishing). In some cases, conventional methods for executing the game may act as an entry barrier for users unfamiliar with the game. In contrast, if the conventional method for executing the game is too simple, users might lose interest in the game easily.

Accordingly, there is a need for providing a game that can enhance user experience and that can be played by users unfamiliar with a specific technique associated with the game.

The above information disclosed in this Background section is only for enhancement of understanding of the background of the disclosed subject matter and therefore may contain information that does not form any part of the prior art nor what the prior art may suggest to a person of ordinary skill in the art.

SUMMARY OF THE DISCLOSURE

Exemplary embodiments of the present disclosure provide a method and a system for a game that may enhance interest in the game and simplify the game by determining the accuracy or success/failure of a user input.

Exemplary embodiments of the present disclosure also provide a method and a system for a game that may lower a user entry barrier for the game and enhance interest in the game simultaneously.

Additional features of the present disclosure will be set forth in the description which follows, and in part will be apparent from the description, or may be learned by practice of the disclosed subject matter.

Exemplary embodiments of the present disclosure disclose a method for a game. The method includes displaying a first determination region in at least one of sections of a virtual passage. The virtual passage comprises a plurality of points. Neighboring points in the plurality of points form a plurality of sections. The method further includes displaying an object configured to move along the virtual passage, and determining, using a processor, an accuracy of an input based on a position of the object, a time when the input is detected, and a position of the first determination region.

Exemplary embodiments of the present disclosure also disclose a system for playing a game. The system includes a determination region display control unit, a determination region display control unit, and a determination unit. The determination region display control unit is configured to control display of a first determination region in at least one of sections of a virtual passage. The virtual passage includes a plurality of points. Neighboring points in the plurality of points form a plurality of sections. The determination region display control unit is configured to control display of an object configured to move along the virtual passage. The determination unit is configured to determine an accuracy of an input based on a position of the object, a time when the input is detected, and a position of the first determination region.

Exemplary embodiments of the present disclosure also disclose a game program distribution system includes a game program distribution server and a terminal. The game program distribution server is configured to transmit a game program to a terminal. Upon execution of the program, the user terminal is configured to display a first determination region in at least one of sections of a virtual passage. The virtual passage includes a plurality of points. Neighboring points in the plurality of points form a plurality of sections. Upon execution of the program, the user terminal is also configured to display an object configured to move along the virtual passage, and to determine an accuracy of an input based on a position of the object, a time when the input is detected, and a position of the first determination region.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

FIG. 4 is a diagram illustrating a virtual passage and a determination region according to exemplary embodiments of the disclosure.

DETAILED DESCRIPTION OF THE ILLUSTRATED EMBODIMENTS

Figure 1:
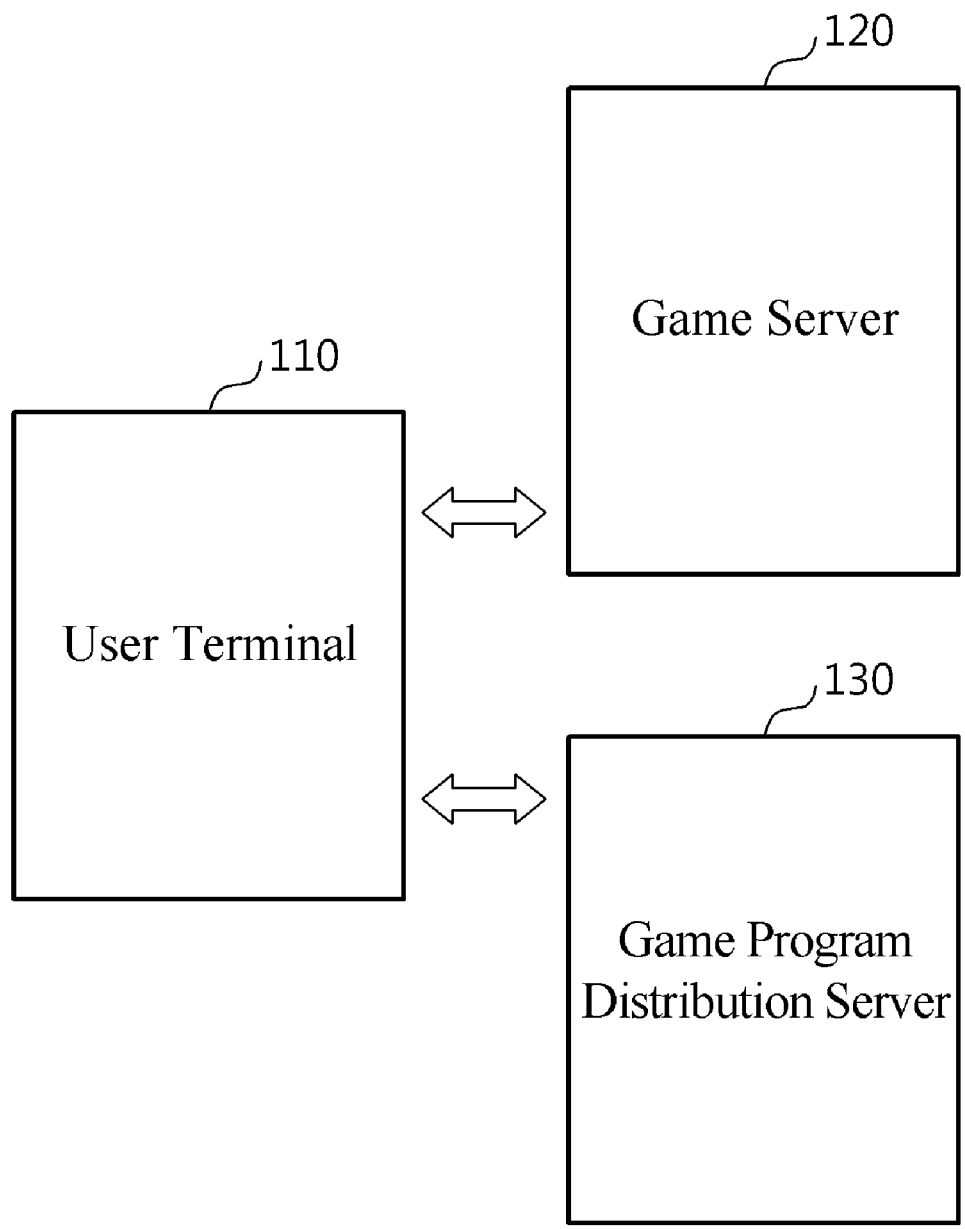
FIG. 1 is a diagram schematically illustrating a game system according to exemplary embodiments of the disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the disclosed subject matter will be described in detail with reference to the accompanying drawings.

FIG. 1 is a diagram schematically illustrating a game system according to exemplary embodiments of the disclosure. The game system shown in FIG. 1 includes a user terminal 110, a game server 120, and a game program distribution server 130.

The user terminal 110 may be a device that can communicate with the game program distribution server 130 via a wire network or a wireless network. Examples of the user terminal 110 include a personal computer (PC), smart phone, electronic pad, smart television (TV), laptop computer, and the like. In general, the user terminal 110 may be any electronic device that can communicate with the game program distribution server 130 and game server 120 over a wire or wireless network. The user terminal 110 may include a display unit (not shown) for displaying information to a user of the user terminal 110. The display unit may be any suitable type of display, for example, a liquid crystal display, an organic light emitting diode display, or a plasma display. The display unit may include a touch screen or a non-touch screen. The user terminal 100 may also have one or more sensors configured to detect user inputs. The user terminal 110 may be provided with a game program from the game program distribution server 130. In some cases, the game program may be downloaded to the user terminal 110 upon receiving a request from a user of the user terminal 110. In some cases, the game program distribution server 130 may transmit the game program according to a scheduled transmission.

The game program distribution server 130 may be any combination of hardware and/or software, and may include various components configured to distribute the game program to various other devices (e.g., user terminal 110). The game program distribution server 130 may include a game program transmitting unit (not shown) configured to transmit a game program to the user terminal 110. A processor (not shown) of the game program distribution server 130 may control the game program transmitting unit. The game program distribution server 130 may also provide updated software for the game program to user terminal 110. In some cases, the updated software may be transmitted according to a scheduled transmission (e.g., periodically or a fixed date or day). The game program distribution server 130 may communicate with user terminal 110 and game server 130.

The game program may be a stand-alone game that can be implemented solely in the user terminal 110 or a network game that can be implemented via communication with the game server 120. Various types of game programs may be provided. For example, the game programs may be related to sports, recreational activities (e.g., fishing), combat, townbuilding, exploration, and the like. The game program may include modules configured to control the user terminal 110 to implement steps of a method for a game which will be described referring to FIGS. 2 and 3.

The game server 120 may communicate with the user terminal 110 and/or the game program distribution server 130. For example, the game server 120 may be a server configured to receive and transmit game-related data to the user terminal 110. In general the game server 120 is configured to support implementation and execution of the game program in one or more user terminals 110. The game server 120 may include any combination of hardware and/or software, and may include various components configured to support the game program. For example, the game server 120 may include a processor configured to control all operations of the game server 120. The processor may control a transceiver for sending and receiving data to one or more user terminals 110.

Figure 2:
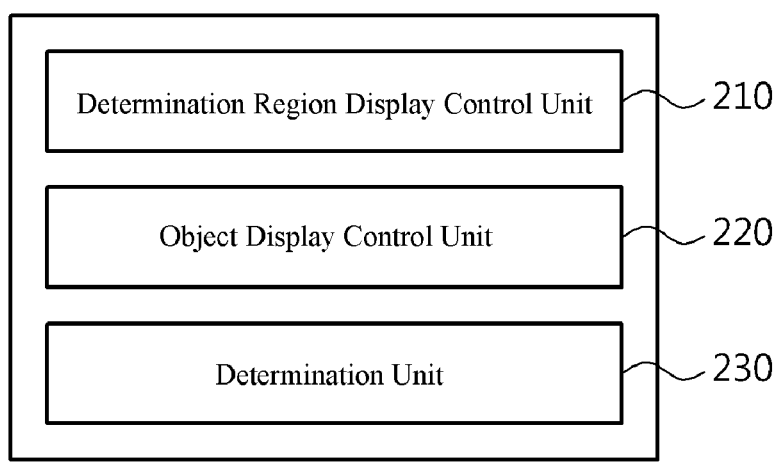
FIG. 2 is a block diagram illustrating an internal configuration of the game system according to exemplary embodiments of the disclosure.
Figure 3:
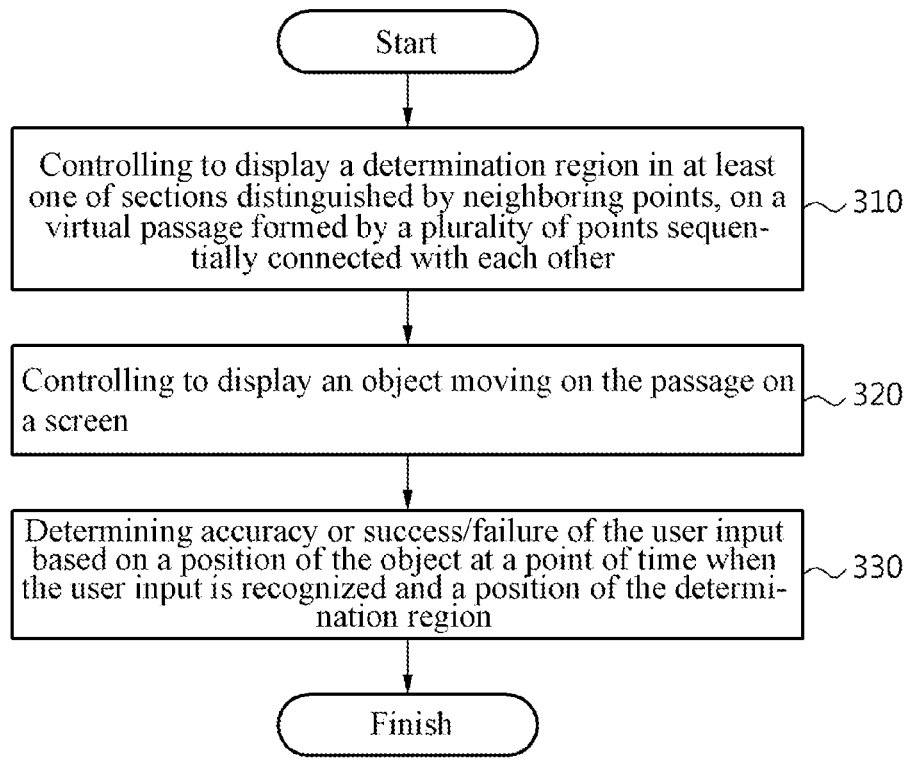
FIG. 3 is a flow chart illustrating a method for a game method according to exemplary embodiments of the disclosure.

FIG. 2 is a block diagram illustrating an internal configuration of a game system according to exemplary embodiments of the disclosure. FIG. 3 is a flow chart illustrating a method for playing a game (referred to hereinafter as "game method") according to exemplary embodiments of the disclosure. The game system 200 may correspond to the user terminal 110 in FIG. 1. As shown in FIG. 2, the game system 200 may include a determination region display control unit 210, an object display control unit 220, and a determination unit 230. The game system 200 may implement a game method described further with reference to FIG. 3.

The determination region display control unit 210, object display control unit 220, and determination unit 230 may be a combination of hardware and/or software components. For instance, in some cases, each of the units 210, 220, and 230 may include a processor for executing the game method. In some cases, each of the units 210, 220, and 230 may include modules for executing the game method. It should be understood that while units 210, 220, and 230 are shown as separate units, in some cases, the units 210, 220, and 230 may be integrated into one unit, and may have separate or combined processors and/or modules.

Referring to FIGS. 2 and 3, the game system 200 may control a display unit to display a screen showing a virtual passage formed by sequentially connected points. The display unit may display a determination region in at least one of sections distinguished by neighboring points on the virtual passage (310). For instance, in a virtual passage having 14 points labeled 'a' to 'n', there may be 13 sections distinguished by the neighboring points, and a determination region may be displayed in at least one of 13 sections. Step 310 may be performed by the determination region display control unit 210 provided in the game system 200.

FIG. 4 is a diagram illustrating a virtual passage and a determination region according to exemplary embodiments of the disclosure. A picture 410 shows a virtual passage 411 formed of 9 points sequentially connected with each other from 'a' to 'i'. The virtual passage 411 shows that 8 sections labeled '1' to '8' can be distinguished from each other using respective neighboring points. The neighboring points, sections, and virtual passage 411 may be displayed on a screen of the user terminal 110. For instance, a picture 420 shows determination regions 421, 422, and 423 displayed on a screen. The first determination region 421 is displayed corresponding to a second section between points 'b' and 'c' in picture 410. The second determination region 422 is displayed corresponding to a fourth section between points 'd' and 'e' in picture 410. The third determination region 423 is displayed corresponding to a fifth section between points 'e' and 'f' in picture 410. Although eight points are shown in FIG. 4, the number of the points is not limited thereto, and numerous points may be displayed. For instance, 14 points may be used and a virtual passage having 13 sections may be formed. The number of points may be preset or controlled dynamically while a game is played.

Referring back to FIGS. 2 and 3, the game system 200 can control an object displayed on the screen, while the object is moving along the virtual passage 411 (320). The object may be displayed on the screen to move along the virtual passage 411 based on various conditions. For instance, the game system 200 may control a display unit to display the object moving towards a target point set based on a number of preset first sections or pausing at a resting point set based on a number of preset second sections. The number of preset first sections and/or the number of preset second sections may be predetermined based on at least one of a level difficulty and an ability of a user. The level difficulty may be set according to a type of target and the ability of the user may be set according to an experience point obtained through playing game. For instance, in fishing game, the type of target may be a type of fish and the ability of the user may be a game level of the user. Step 320 may be performed by the object display control unit 220 provided in the game system 200.

Figure 5:
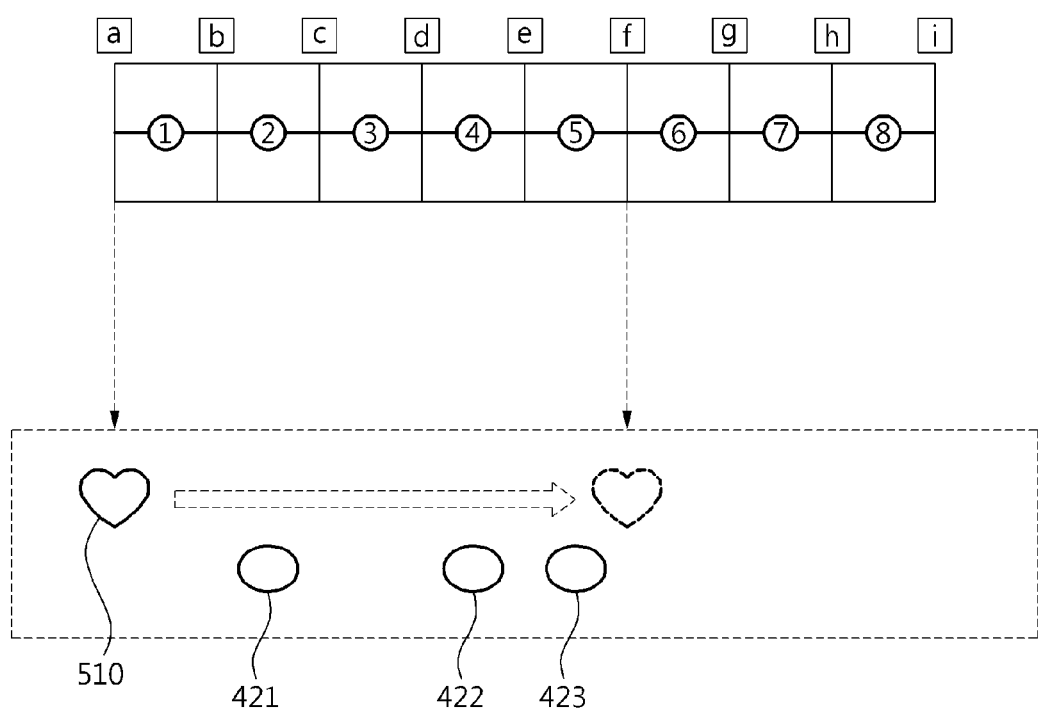
FIG. 5 is a diagram illustrating an object and a determination region according to exemplary embodiments of the disclosure.

FIG. 5 is a diagram illustrating an object and a determination region according to exemplary embodiments of the disclosure. FIG. 5 shows the determination regions 421, 422, and 423, and an object 510 realized as a heart shape. In FIG. 5, the object 510 was realized as the heart shape. However, the object 510 may be realized as one of various shapes, such as a fish shape or a float shape.

If the number of preset first sections is set to '5' and the starting point is 'a', the object 510 may move from 'a' (starting point) to 'f' (target point), as shown in FIG. 5.

If the number of preset second sections is '3', the object 510 may pause at point 'd' for a predetermined time period and move toward 'f' as a target point. When the object 510 reaches 'f' as the target point, the game system 200 may change a target point based on the number of preset first sections. For instance, 'i' may be set as a target point the object 510 can reach after moving three sections from 'f' in a right direction. The predetermined time period that object 510 pauses may be set by the user or set per a manufacturer's default setting. In some cases, when the object 510 reaches a target point, the object 510 may pause for a preset time to indicate that a target point has been reached.

A direction in which the object 510 moves may be changed based on a probability of directional change. For instance, when the object 510 moves from starting point 'a' and reaches target point 'f', the direction of movement of the object 510 can be changed according to the probability of direction change. For instance, the target point may be changed from 'f' to 'a' that is 5 sections in another direction. The probability of direction change may be predetermined based on at least one of a level difficulty and an ability of a user.

Moreover, when the object 510 reaches the target point 'f', the speed of the object 510 can also be changed based on a preset variable range for the level difficulty of target.

As mentioned above, the object 510 can move on the virtual passage 411 according to various conditions. The game system 200 may display the movement of the object 510 on the screen.

Referring back to FIGS. 2 and 3, the game system 200 may determine a position of the object 510 at a point on the virtual passage 411, may detect a user input, and may determine the accuracy of the user input or success or failure of the user input (330). For instance, if the object 510 reaches the same position as a determination region, the user may select (e.g., touch the screen or click through an input device) a preset user interface to generate an event. The game system 200 may detect the user input and compare the position of the object 510 at the point where the user input is detected with the position of the determination region. If the position of the object 510 is within a threshold range of the determination region, the game system 200 may determine the accuracy of the user input or the success or failure of the user input. The threshold range may be set by the user or a manufacturer of the game system 200. For instance, in some cases, the threshold range may be set to half or one section to the left or the right of the determination region. Step 330 may be performed by the determination unit 230 provided in the game system 200.

Figure 6:
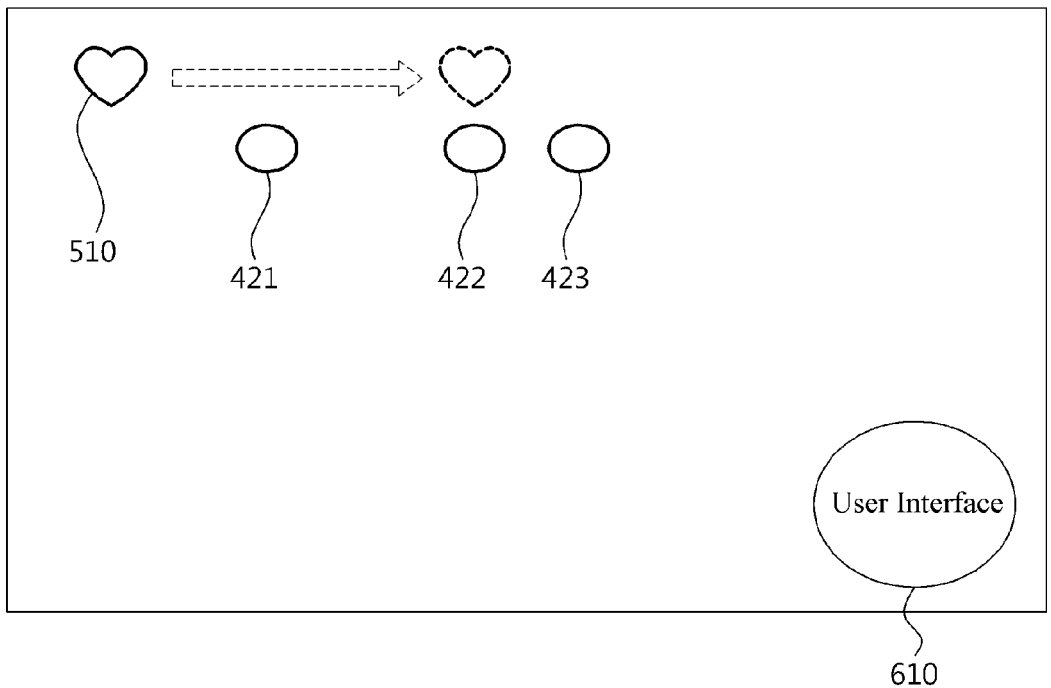
FIG. 6 is a diagram illustrating a portion of a touchscreen of a user terminal according to exemplary embodiments of the disclosure.

FIG. 6 is a diagram illustrating a touchscreen of a user terminal according to exemplary embodiments of the disclosure. The touchscreen 600 shows a screen of the user terminal 110. The user terminal 110 may correspond to the game system 200. The screen 600 may display the determination regions 421, 422, and 423 and the object 510. The object 510 may move along a virtual passage in a direction of the arrow shown in FIG. 6.

The user may touch a region of the screen displaying the user interface 610 when the object 510 is moving. The user terminal 110 may then determine how accurate the user input is or whether the user input succeeds or fails, based on a position of the object 510 when the user's touch is detected and based on the position of a determination region (e.g., the second determination region 422). The position of the object 510 and the position of the second determination region 422 may be positions along the virtual passage 411.

In some cases, the game method may further include a step (not shown) of displaying a new determination region in a section where the object 510 has passed based on a calculated probability whenever the object 510 passes a plurality of sections. The new determination region may be additionally displayed in at least one section randomly selected among sections where the object 510 has passed. This step may be performed by the determination region display control unit 210 provided in the game system 200.

The probability may be calculated based on a number of determination regions set while the object 510 moves from a start point to a target point on the virtual passage 411, a number of determination regions newly created according to the movement of the object 510 from the start point to a current point of the object 510, and a number of the remaining sections to a target point from the current point at which the object 510 is positioned. More specifically, the probability may be calculated using the following Mathematical Equation 1:

$$P(Probability)=(A-B)/C \qquad \text{Mathematical Equation 1}$$

'A' may refer to the number of determination regions set while the object is moving from a start point to a target point on the virtual passage 411. 'B' may refer to a number of determination regions newly created according to the movement of the object 510 from the start point to a current point. 'C' may refer to a number of remaining sections to a target point from the current point of the object 510.

Figure 7:
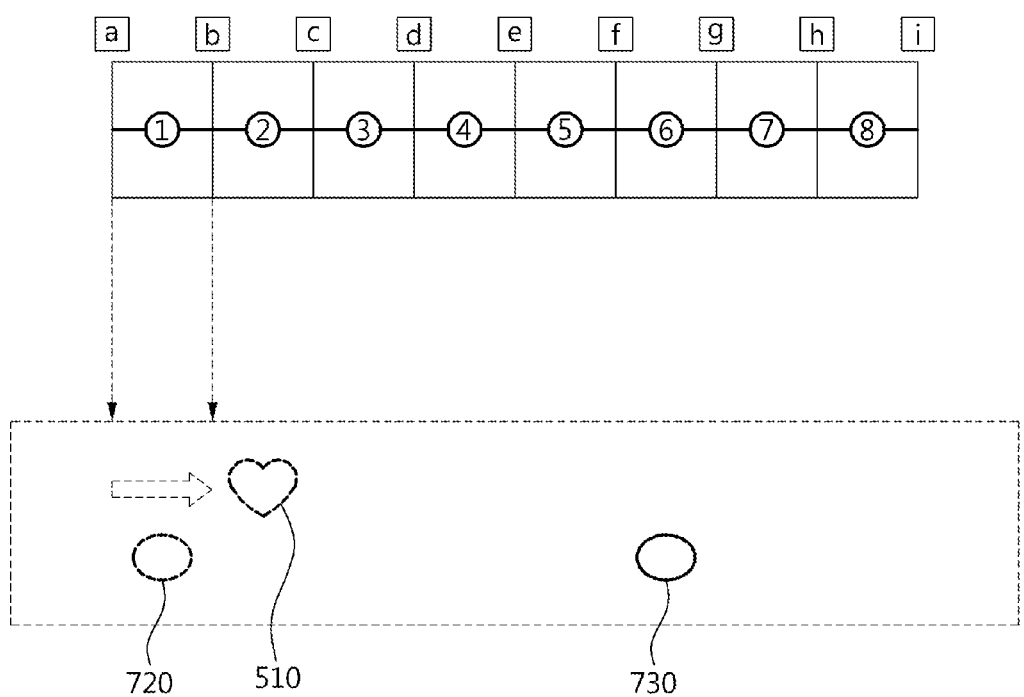
FIG. 7 is a diagram illustrating a new determination region additionally displayed according to exemplary embodiments of the disclosure.

FIG. 7 is a diagram illustrating a new determination region additionally displayed according to exemplary embodiments of the disclosure.

FIG. 7 shows that a new determination region 720 is additionally displayed in section '1' after the object 510 passes section '1'. Based on the probability calculated after the object 510 passes section '1', a determination is made as to whether a new determination region 720 should be displayed. In FIG. 7, the determination region 730 is displayed early irrespective of the movement of object 510.

As an example, 'A' in Mathematical Equation 1 may be set to 2 and a target point may be 'f'. A new determination region may not be generated according to the movement of the object 510 and accordingly 'B' may have a value of '0'. There are four sections from section '2' to '5' and therefore 'C' may have a value of '4'. Accordingly, the probability that a new determination region 720 will be displayed may be calculated as '(2−0)/4=1/2' based on Mathematical Equation 1.

If a new determination region 720 is additionally displayed as the object 510 passes section '2', the calculated probability of another determination region displayed on the section '2' may be '(2−1)/3=1/3'. In contrast, if no new determination region 720 is displayed, the calculated probability of another determination region displayed on the section '2' when the object 510 passes section '2' may be '(2−0)/3=2/3'. The numerator of Mathematical Equation 1 is set so that it cannot be smaller than '0'.

In some cases, the game method may further include a step (not shown) of determining a moving direction of the object 510 based on a preset direction variation probability or determining the speed of the object 510 based on a preset speed variation range when the object 510 reaches a target point set according to a number of preset first sections or a pause point set according to a number of preset second sections. This step may be performed by a moving direction determination unit (not shown) in the game system 200. For example, the object display control unit 220 in the game system 200 may control display of the object 510 based on a moving direction or speed determined by the moving direction determination unit.

In some cases, the game method may further include a step (not shown) of determining an achieved score based on an ability set for the user or a character selected by the user and a step (not shown) of determining whether a goal for the user or the character of the user is achieved, based on the achieved score and a target score set according to a level difficulty of a target. For instance, in a fishing game, the goal may include getting a target fish based on the achieved score. These steps may be performed by an achieved score determination unit (not shown) and a goal achieving determination unit (not shown) that may be further provided in the game system 200. For instance, the achieved score may be determined based on the accuracy of the user input, and the target score may be determined based on a level of difficulty.

Figure 8:
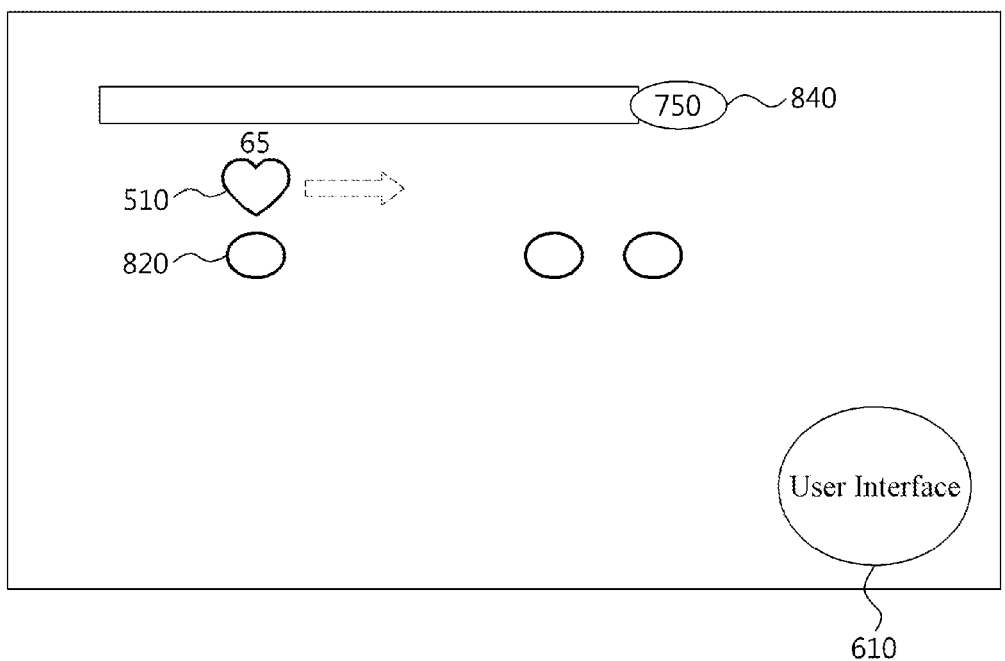
FIGS. 8 and 9 are diagrams illustrating examples of a target score and an achieved score according to exemplary embodiments of the disclosure.
Figure 9:
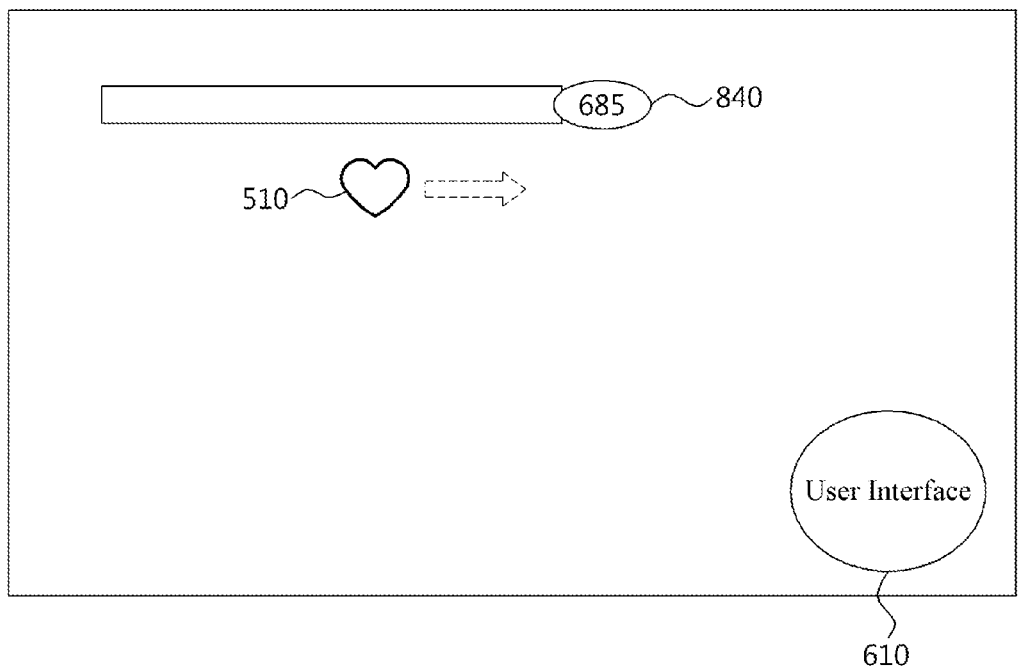

FIGS. 8 and 9 are diagrams illustrating examples of a target score and an achieved score according to exemplary embodiments of the disclosure. A first screen 800 shows an object 510 passing a determination region 820 in a direction of the illustrated arrow. The first screen 800 may display an achieved score of '65' based on the user's performance (i.e., determinations that the user inputs have been accurate or successful). The achieved score may be calculated, in part, based on the ability set for the user or the character of the user. The first screen 800 may also display '750' as a current target score 840. A second screen 900 may display a remaining target score of '685', which corresponds to the achieved score '65' being subtracted from the target score '750' 840. In some cases, the target may be achieved once the remaining target score 840 reaches '0'. For instance, in a fishing game, a physical strength of a fish may be expressed as the target score 840. When the physical strength of the fish is reduced down to '0', the fish maybe caught (i.e., goal achieved).

In some cases, the game method may further include a step (not shown) of removing a displayed determination region when it is determined that the user input is accurate or successful. For example, the determination region 820 in FIG. 8 is removed in FIG. 9 in response to the user input being determined as accurate or successful.

Next, exemplary embodiments of an object movement process will be described with reference to FIGS. 10, 11, 12, 13, 14, 15, and 16. Initial values and variables used in these exemplary embodiments are described in Table 1.

TABLE 1

| Initial Value | |
|---|---|
| Initial Determination Region Number | The number of the determination regions initially created |
| Maximum Determination Region Number | The maximum number of determination regions that are displayable at a time |
| Determination Region Creation Rate | The number of determination regions that will be created while an object is moving to a target point |
| Start Point | A point where an object is displayed initially |
| Target Point Set Section Number | The number of sections for determining a target point |
| Target Point Range | A range in which the number of the target point setting sections is variable |
| Initial Object Speed | An initial moving speed of an object. |
| Object Moving Speed Range | A variable range in which the moving speed of an object is changed at a target point (e.g., number of sections moved per unit time (seconds)) |
| Pause Point Section Number | The number of sections to the next pause point |
| Pause Point Section Range | A variable range of numbers of pause point sections |
| Pausing Time (seconds) | The time for which the movement of the object is paused at a pause point |
| Pausing Time Range (seconds) | A variable range of a pausing time |
| Direction Variation Probability | The Probability of direction variation at a target point (0~100%) |
| Direction Variation Probability Range | A variable range of direction variation probabilities |
| Variables | |
| Current Position | A point at which an object is currently positioned |
| Determination Region Creation Probability | The probability that a determination region is created whenever an object passes one section (see Mathematical Equation 1) |
| Target Point | A point that is a target of a moving object |
| Pause Point Determination | Determine whether the target point is a pause point |
| Pausing Time (seconds) | The time for which the movement of the object is paused |
| Object Moving Speed | A current moving speed of the object (e.g., number of sections moved per unit time (seconds)). |

Figure 10:
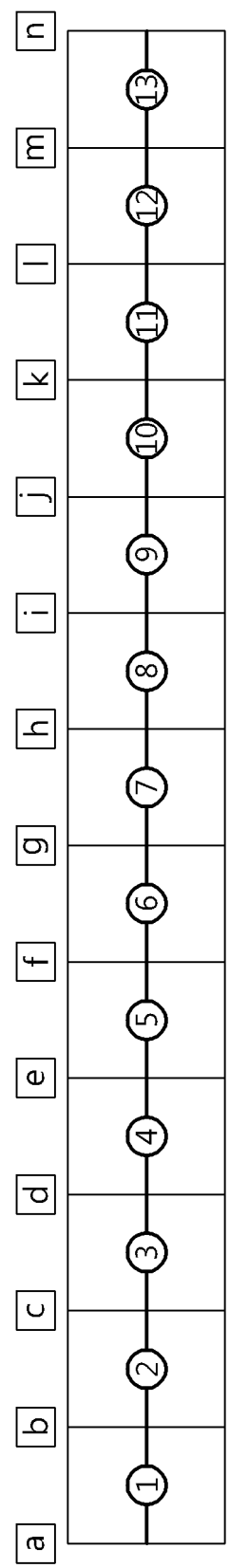
FIG. 10 is a diagram illustrating an example of a virtual passage formed by sequentially connected points according to exemplary embodiments of the disclosure.

FIG. 10 is a diagram illustrating an example of a virtual passage formed by sequentially connected points according to exemplary embodiments of the present disclosure. FIG. 10 shows a virtual passage having 13 sections formed by 14 points. The initial values of the virtual passage in FIG. 10 are given as shown in following Table 2:

TABLE 2

| Initial Value | |
|---|---|
| Initial Determination Region Number | 3 |
| Maximum Determination Region Number | 5 |
| Determination Region Creation Rate | 3 |
| Start Point | a |
| TargetPoint Set Section Number | 13 |
| TargetPoint Range | 0 |
| Initial Object Speed | 6 |
| Object Moving Speed Range | 0 |
| Pause Point Section Number | 13 |
| Pause Point Section Range | 0 |
| Pausing Time | 0.5 |
| Pausing Time Range | 0.2 |
| Direction Variation Probability | 0 |
| Direction Variation Probability Range | 0 |

Figure 11:
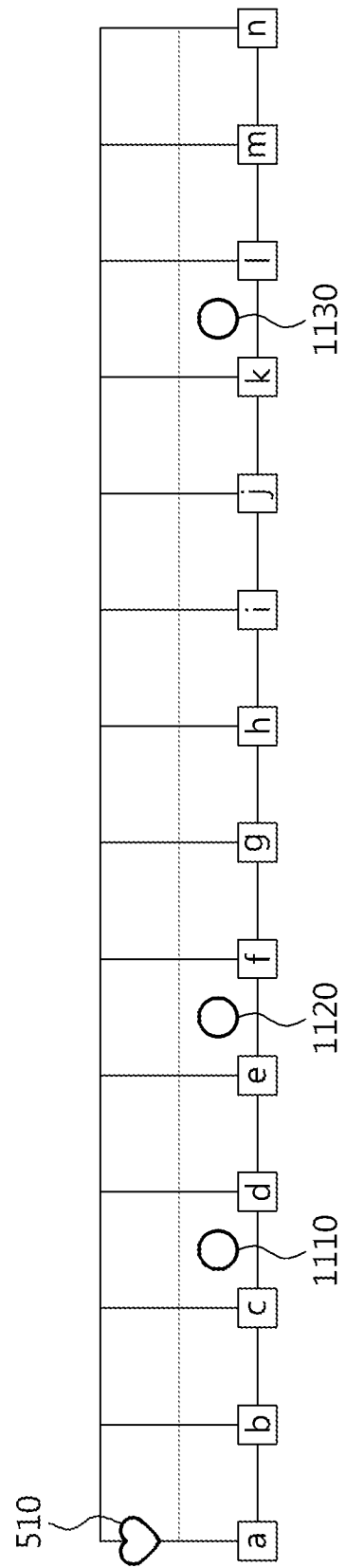
FIG. 11 is a diagram illustrating an example of an initial appearance of an object according to exemplary embodiments of the disclosure.

FIG. 11 is a diagram illustrating an example of an initial appearance of an object according to exemplary embodiments of the disclosure. In Table 2, the number of initial determination regions is '3'. FIG. 11 displays three determination regions 1110, 1120, and 1130. As shown in FIG. 11 and noted in Table 2, a start point is 'a' and an object 1140 is displayed at point 'a'. Accordingly, the variables noted above in Table 1 may have following values, as shown in the following Table 3:

TABLE 3

| Variables | |
|---|---|
| Current Position | A |
| Determination Region Creation Probability | 3/13 |
| Target Point | N |
| Pause Point Determination | True (or 1) |
| Pausing Time | 0.5 |
| Object Moving Speed | 6 |

Object 510 may move toward a target point at a moving speed of '6' sections per unit time (e.g., seconds). The number of pause point sections and the number of turning point set sections are 13, such that the target point may be set as a pause point. Accordingly, when the object 510 reaches the target point 'n', the object 510 may pause for a time period corresponding to a pausing time of '0.5' seconds and then move again. In this example, the target point 'n' is the last point, and the object 1140 may move toward point 'n', regardless of the direction variation probability.

Figure 12:
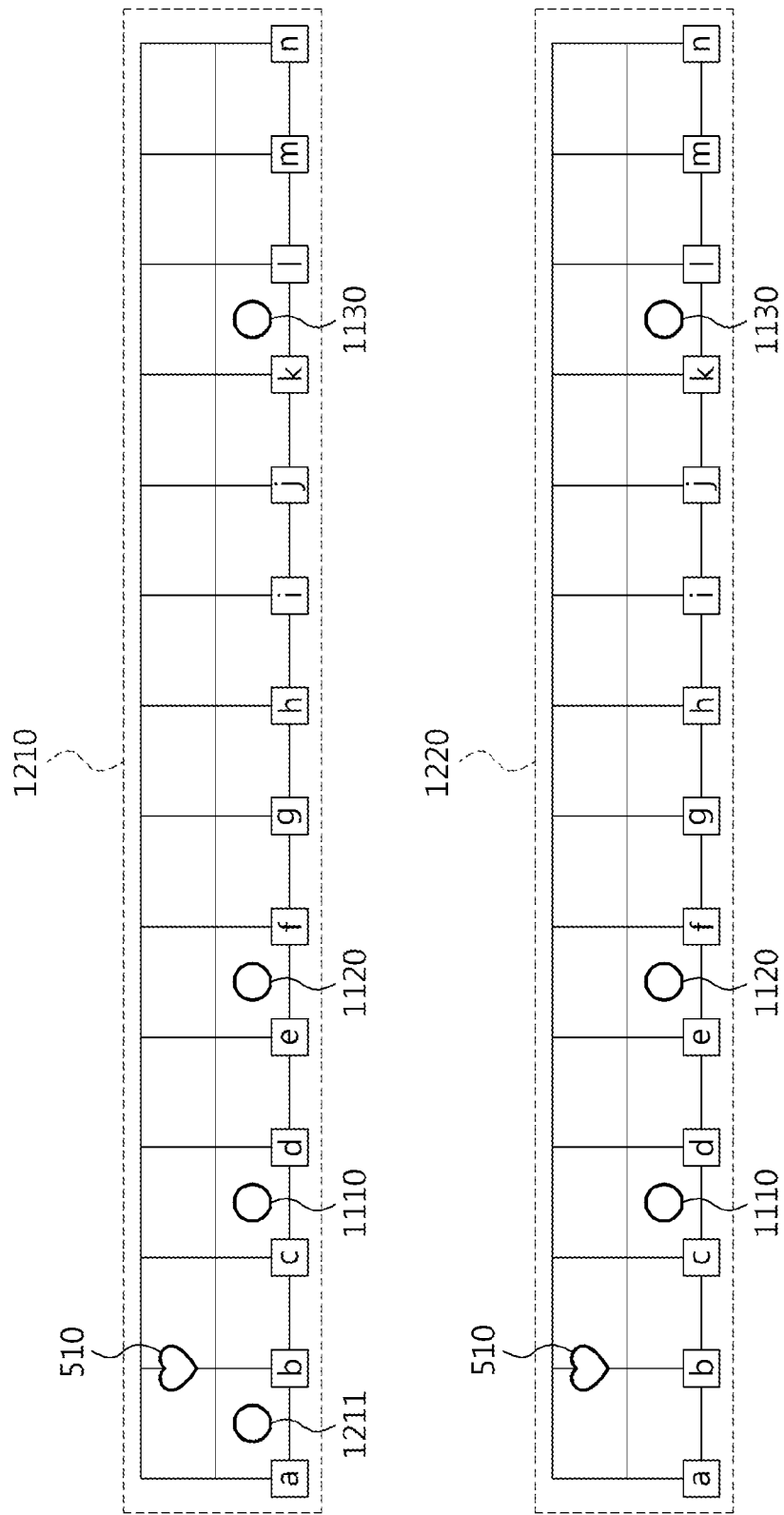
FIG. 12 is a diagram illustrating an example in which a new determination region is additionally provided and an example in which no new determination region is provided, according to exemplary embodiments of the disclosure.

FIG. 12 is a diagram illustrating an example in which a new determination region is added and an example in which no new determination region is added, according to exemplary embodiments of the disclosure. In FIG. 12, in the example shown in the first dotted line box 1210, a new determination region 1211 is added when the object 510 moves from point 'a' to point 'b'. In the example shown in the second dotted box 1220, no new determination region 1211 is added when the object 510 moves from point 'a' to point 'b'.

In the example shown in the first dotted box 1210, the determination region creation probability shown in Table 3 may be changed to '(3−1)/12=2/12' based on Mathematical Equation 1. In the example shown in the second dotted box 1210, the determination region creation probability in Table 3 may be changed to '(3−0)/12=3/12'. If a determination region is added when the object 510 moves from point 'b' to point 'c', the determination region creation probability in Table 3 may be changed to '(3−2)/11=1/11'. If no determination region is added, the determination region creation probability may be changed to '(3−0)/11=3/11' when the object 510 moves from the point of 'b' to the point of 'c'.

Figure 13:
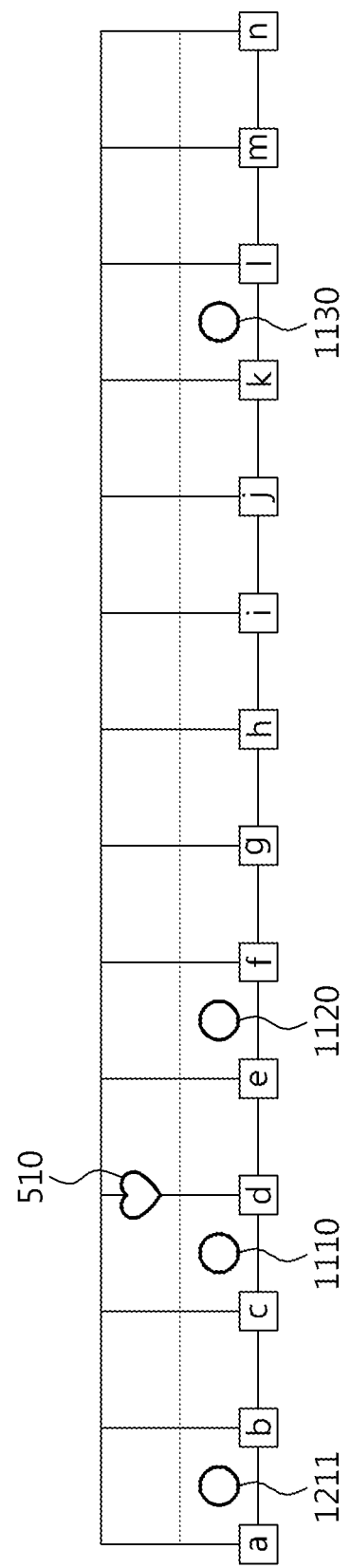
FIG. 13 is a diagram illustrating an object having moved to a section where a determination region is marked, according to exemplary embodiments of the disclosure.

FIG. 13 is a diagram illustrating an example of an object 510 having moved past a section where a determination region is marked, according to exemplary embodiments of the disclosure. In FIG. 13, new determination region 1211 is generated after the object 510 passes section '1' (i.e., section between point 'a' and point 'b'), and no determination region is created after the object 510 passes section '2' (i.e., section between point 'b' and point 'c'). When the object 510 passes section '3' (i.e., section between point 'c' and point 'd') and a determination region 1110 is created, the accuracy, success, or failure of a user input may be determined. If the user input is determined to be accurate or successful, the display of the determination region 1110 may be removed.

If the user input is determined to be inaccurate or unsuccessful, a new determination region may be additionally added, and the determination region creation probability may be changed to '(3−2)/10=1/10'. When a new determination region is additionally created after the object 510 passes section '4' (i.e., section between point 'd' and point 'e'), the determination region creation probability may be changed to '(3−3)/9=0/9=0' and no determination region is additionally displayed until the object 510 reaches a target point of 'n'.

Figure 14:
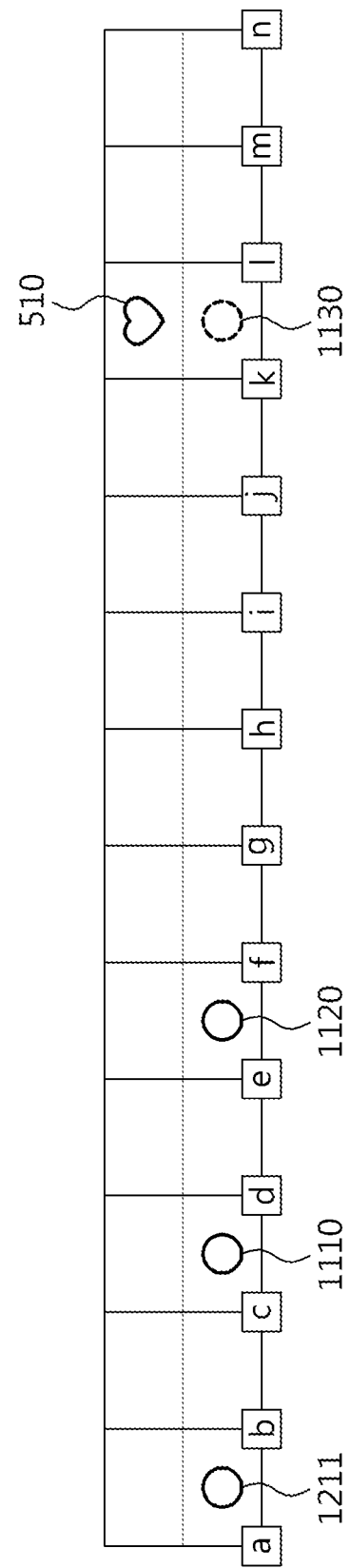
FIG. 14 is a diagram illustrating an example of a determination region being eliminated, according to exemplary embodiments of the disclosure.

FIG. 14 is a diagram illustrating an example of a determination region being eliminated, according to exemplary embodiments of the disclosure. If a user input for a determination region 1120 in section '5' (i.e., section between point 'e' and point 'f') is successful, the determination region creation probability may be '(3−3)/8=0/8=0' when the object 510 is positioned at point 'f' and no determination region is added until the object 1140 reaches a target point 'n'. If the user input for the determination region 1130 in section '11' (i.e., section between point 'k' and point 'l') is successful, the determination region 1130 may be removed from the screen.

Figure 15:
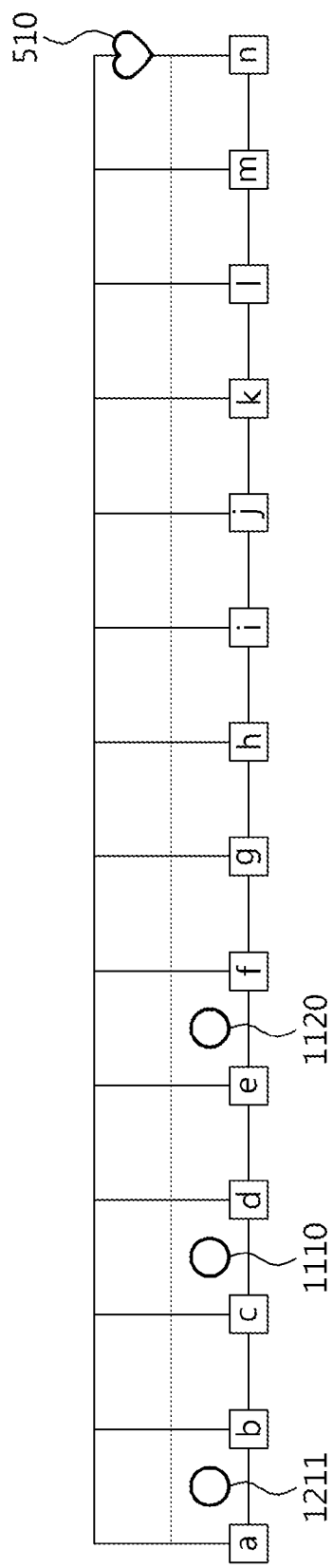
FIG. 15 is a diagram illustrating an example of an object reaching a target point, according to exemplary embodiments of the disclosure.

FIG. 15 is a diagram illustrating an example of an object reaching a target point, according to exemplary embodiments of the disclosure. When the object 510 reaches the target point 'n', the target point may be changed to point 'a'. In addition, the determination region creation probability may be changed to '(3−0)/13=3/13' according to the target point of 'a'. Since the former target point of 'n' is a pause point, the object 510 may pause for a predetermined time period corresponding to the pausing time of 0.5 seconds and subsequently move towards the new target point 'a'.

In FIGS. 10, 11, 12, 13, 14, and 15, the initial values (as explained in Table 1) were provided to explain the illustrated exemplary embodiments. However, the initial value may be set differently based on a level of difficulty of the game.

According to exemplary embodiments of the disclosure, the accuracy or success/failure of a user input may be determined based on a user providing an input at a time when a moving object (e.g., object 510) enters a determination region, so as to play the game. Accordingly, a simple game may be provided and an interest in the game may be enhanced. In addition, an entry barrier for users to play a game may be lowered and the interest in the game may be enhanced. The described game method may be applied to various types of games, including for example, a fishing game The game method described hereinabove may be executed in any suitable device realized by hardware components, software components, and/or a combination of hardware and software components. For instance, the device and components may be realized by using one or more common computers or special purpose computers, which may include a processor, a controller, an Arithmetic Logic Unit (ALU), a digital signal processor, a microcomputer, a Field Programmable Array (FPA), a Programmable Logic Unit (PLU), a microprocessor. The device and components may implement an instruction and respond to the instruction. A processor may execute an operating system (OS) and one or more software applications running on the OS. The processor may store, process, and create data in response to the implementation of software.

The software may include a computer program, a code, an algorithm, an instruction, and any combination thereof. The software may include a mechanical language code made by a compiler and a high level language code implementable by a computer, using an interpreter, and the like. The software may be dispersed on a computer system or through a network. The software and data may be stored or implemented in one or more computer readable recording medium.

The computer readable medium may include a program command, a data file, a data structure, or combination of them. The program command recorded in the medium may be configured for exemplary embodiments of the disclosure. Examples of computer readable medium include magnetic medium such as a hard disk, a floppy disk, optical medium such as CD-ROM and DVD, magneto-optical medium such as a floptical disk, and a hardware device such as ROM, RAM, and a flash memory. The hardware device may be configured to execute one or more software modules to implement the exemplary embodiments.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:
1. A method of executing a simulation game on a terminal in communication with a game server, the method comprising:
providing the simulation game from the game server to the terminal for installation;
displaying, on a display of the terminal, a first determination region in at least one of a plurality of sections of a virtual passage, the virtual passage comprising a plurality of points, and neighboring points in the plurality of points forming the sections;
displaying, on the display of the terminal, an object configured to move along the virtual passage;
displaying, on the display of the terminal, a second determination region in one of the sections of the virtual passage that the object has passed, based on a determined probability; and
determining, using a processor, an accuracy of an input based on a position of the object, a time when the input is detected, and a position of the first determination region,
wherein the determined probability is calculated based on a number of determination regions displayed while the object is moving from a start point to a last point on the virtual passage, a number of determination regions newly created according to a movement of the object from the start point to a current point of the object, and a number of remaining sections to a target point from a section corresponding to the current point of the object.

2. The method of claim 1, wherein displaying the object configured to move along the virtual passage comprises displaying movement of the object to a target point based on a number of set first sections or displaying the object as pausing, for a determined time period, at a pause point based on a number of set second sections.

3. The method of claim 1, further comprising:
determining a moving direction of the object based on a direction variation probability or determining a moving speed of the object based on a moving speed variation range, when the object reaches a target point set based on a number of set first sections or a pause point set based on a number of set second sections,
wherein displaying the object configured to move along the virtual passage comprises displaying movement of the object based on the determined moving direction or the determined moving speed.

4. The method of claim 1, further comprising:
displaying an achieved score of a user in response to the input being accurate; and
determining whether a goal for the user is achieved based on the achieved score and a target score set based on a level of difficulty in achieving the target.

5. The method of claim 1, wherein at least one of a moving speed of the object, a moving speed variation range of the object, a direction variation probability of the object at a target point, and a number of first sections used to set a target point is determined based on a level of difficulty, and
wherein movement of the object is displayed based on the at least one of the moving speed of the object, the moving speed variation range of the object, the direction variation probability of the object at the target point, and the number of first sections used to set the target point.

6. The method of claim 1, further comprising:
discontinuing display of the first determination region in response to the input being accurate.

7. A system for playing a simulation game provided from a came server in communication with the system, the system comprising:
a determination region display control unit configured to:
control display of a first determination region in at least one of a plurality of sections of a virtual passage, the virtual passage comprising a plurality of points, neighboring points in the plurality of points forming the sections; and
display a second determination region in one of the sections of the virtual passage of the first determination region, based on a determined probability;
an object display control unit configured to control display of an object configured to move along the virtual passage; and
a determination unit configured to determine an accuracy of an input based on a position of the object, a time when the input is detected, and a position of the first determination region,
wherein the determined probability is calculated based on a number of determination regions displayed while the object is moving from a start point to a last point on the virtual passage, a number of determination regions newly created according to a movement of the object from the start point to a current point of the object, and a number of remaining sections to a target point from a section corresponding to the current point of the object.

8. The system of claim 7, wherein the object display control unit is configured to control display of movement of the object to move to a target point based on a number of set first sections or to display the object as pausing, for a determined time period, at a pause point based on a number of set second sections.

9. The system of claim 7, further comprising:
a moving direction determination unit configured to determine a moving direction of the object based on a direction variation probability or configured to determine a moving speed of the object based on a moving speed variation range, when the object reaches a target point set based on a number of set first sections or a pause point set based on a number of set second sections,
wherein the object display control unit is configured to control display of movement of the object based on the determined moving direction or the determined moving speed.

10. The system of claim 7, further comprising:
an achieved score determination unit configured to determine an achieved score of a user in response to the input being accurate; and
a goal achieving determination unit configured to determine whether a goal for the user is achieved based on the achieved score and a target score set based on a level of difficulty in achieving the target.

11. The system of claim 7, wherein at least one of a moving speed of the object, a moving speed variation range of the object, a direction variation probability of the object at a target point, and a number of first sections used to set the target point is determined based on a level of difficulty, and
wherein the object display control unit is configured to control display of movement of the object along the virtual passage based on the at least one of the moving speed of the object, the moving speed variation range of the object, the direction variation probability of the object at the target point, and the number of first sections used to set the target point.

12. The system of claim 7, further comprising:
a determination region removing unit configured to discontinue display of the first determination region in response to the input being accurate.

13. A game program distribution system for executing a simulation game program in a terminal, comprising:
a game program distribution server configured to transmit the simulation game program to the terminal,
wherein, upon execution of the game program, the terminal is configured to:
display a first determination region in at least one of a plurality of sections of a virtual passage, the virtual passage comprising a plurality of points, neighboring points in the plurality of points forming the sections;
display a second determination region in one of the sections of the virtual passage of the first determination region, based on a determined probability;
display an object configured to move along the virtual passage; and
determine an accuracy of an input based on a position of the object, a time when the input is detected, and a position of the first determination region, and
wherein the determined probability is calculated based on a number of determination regions displayed while the object is moving from a start point to a last point on the virtual passage, a number of determination regions newly created according to a movement of the object from the start point to a current point of the object, and a number of remaining sections to a target point from a section corresponding to the current point of the object.

* * * * *